(12) United States Patent
Parekh et al.

(10) Patent No.: US 10,683,718 B2
(45) Date of Patent: Jun. 16, 2020

(54) DOWNHOLE TOOLS HAVING EASILY REMOVABLE INSERTS

(71) Applicants: Yash Parekh, Houston, TX (US); Zhiyue Xu, Cypress, TX (US)

(72) Inventors: Yash Parekh, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 285 days.

(21) Appl. No.: 15/351,892

(22) Filed: Nov. 15, 2016

(65) Prior Publication Data

US 2018/0135369 A1 May 17, 2018

(51) Int. Cl.
*E21B 23/01* (2006.01)
*C04B 35/10* (2006.01)
(Continued)

(52) U.S. Cl.
CPC ............... *E21B 23/01* (2013.01); *C04B 35/10* (2013.01); *C04B 35/565* (2013.01); *C04B 35/584* (2013.01); *C22C 5/06* (2013.01); *C22C 9/01* (2013.01); *C22C 19/03* (2013.01); *C22C 21/06* (2013.01); *C22C 23/02* (2013.01);
(Continued)

(58) Field of Classification Search
CPC combination set(s) only.
See application file for complete search history.

(56) References Cited

U.S. PATENT DOCUMENTS 3,433,701 A * 3/1969 Armour ............... C09J 131/04
428/436
5,856,371 A * 1/1999 Grimm ................ B32B 5/20
264/45.1
(Continued)

FOREIGN PATENT DOCUMENTS

WO 2016093865 A1 6/2016

OTHER PUBLICATIONS

Weatherford Packer Systems [online]; [retrieved on Nov. 7, 2011, from the Internet http:/www.weatherford.com/weatherford/groups/web/documents/weatherfordcorp/WFT002126.pdf.] "HRP Hydraulic Retrievable Production Packer", Weatherford International Ltd. (2007) 2 pages.
(Continued)

*Primary Examiner* — Taras P Bemko
*Assistant Examiner* — Ronald R Runyan
(74) *Attorney, Agent, or Firm* — Cantor Colburn LLP

(57) ABSTRACT

An anchor member comprises a substrate; and at least one insert secured to the substrate and extending outwardly from an outer surface of the substrate. The insert is configured for engagement with another member. In an embodiment, the insert comprises a shell at least partially defining an empty core. Alternatively, the insert comprises an inner portion and an outer portion disposed on the inner portion; the inner portion comprising a soft material which comprises one or more of the following: a low carbon steel or an aluminum alloy; and the outer portion comprising the soft material and a hard material and having a gradient in the weight ratio of the soft material to the hard material, the hard material comprising one or more of the following: an intermetallic compound; a ceramic; a hard steel; or a titanium alloy.

11 Claims, 3 Drawing Sheets

(51) Int. Cl.

| | | |
|---|---|---|
| *C04B 35/565* | (2006.01) | |
| *C04B 35/584* | (2006.01) | |
| *C22C 5/06* | (2006.01) | |
| *C22C 9/01* | (2006.01) | |
| *C22C 19/03* | (2006.01) | |
| *C22C 21/06* | (2006.01) | |
| *C22C 23/02* | (2006.01) | |
| *C22C 38/06* | (2006.01) | |
| *E21B 33/129* | (2006.01) | |

(52) U.S. Cl.
CPC .......... *C22C 38/06* (2013.01); *E21B 33/1293* (2013.01); *C04B 2235/3217* (2013.01); *C04B 2235/3826* (2013.01); *C04B 2235/3873* (2013.01)

(56) References Cited

U.S. PATENT DOCUMENTS

| | | |
|---|---|---|
| 5,984,007 A | 11/1999 | Yuan et al. |
| 6,167,963 B1 | 1/2001 | McMahan et al. |
| 7,546,872 B2 | 6/2009 | McGilvray, Jr. et al. |
| 8,211,247 B2 | 7/2012 | Marya et al. |
| 8,695,714 B2 | 4/2014 | Xu et al. |
| 8,919,452 B2 | 12/2014 | Palmer et al. |
| 9,027,655 B2 | 5/2015 | Xu et al. |
| 2011/0048743 A1 | 3/2011 | Stafford et al. |
| 2011/0132620 A1 | 6/2011 | Agrawal et al. |
| 2011/0135953 A1 | 6/2011 | Xu et al. |
| 2013/0048305 A1 | 2/2013 | Xu et al. |
| 2014/0131050 A1 | 5/2014 | Xu et al. |
| 2014/0190685 A1 | 7/2014 | Frazier et al. |
| 2014/0224477 A1 | 8/2014 | Wiese et al. |
| 2014/0224506 A1* | 8/2014 | Xu ........................ E21B 33/134 166/376 |

OTHER PUBLICATIONS

International Search Report, International Application No. PCT/US2017/056073, dated Jan. 19, 2018, Korean Intellectual Property Office; International Search Report 3 pages.

International Written Opinion, International Application No. PCT/US2017/056073, dated Jan. 19, 2018, Korean Intellectual Property Office; International Written Opinion 8 pages.

\* cited by examiner

DOWNHOLE TOOLS HAVING EASILY REMOVABLE INSERTS

BACKGROUND

Slips are known in the downhole drilling and completions industry for anchoring tools in a borehole. Slips are generally wedge-shaped devices that have teeth or other protrusions for "biting" into a tubular wall, typically a casing, as load is applied to the slips. The teeth or other protrusions of the slips can be in the form of slip inserts. When no longer needed, it is common to remove the tools by milling or drilling operations. In current slips, slip inserts are typically made of tungsten carbide or other materials that are difficult to remove by drilling or milling. Normally slip inserts take the longest time to mill or drill and the milling or drilling operations can be damaging to the bits used. In addition, slip inserts can remain in the borehole after milling or drilling and are very difficult to fish out. Therefore, the development of downhole tools having slip inserts that are effective to bite in the casing yet at the same time can be easily removed are very desirable.

BRIEF DESCRIPTION

An anchor member comprises a substrate; and at least one insert secured to the substrate and extending outwardly from an outer surface of the substrate; the insert configured for engagement with another member and comprising a shell at least partially defining an empty core.

In another embodiment, an anchor member comprises: a substrate; and at least one insert secured to the substrate and extending outwardly from an outer surface of the substrate; the insert configured for engagement with another member and comprising an inner portion and an outer portion disposed on the inner portion; the inner portion comprising a soft material which comprises one or more of the following: a low carbon steel or an aluminum alloy; and the outer portion comprising the soft material and a hard material and having a gradient in the weight ratio of the soft material to the hard material, the hard material comprising one or more of the following: an intermetallic compound; a ceramic; a hard steel; or a titanium alloy.

A downhole apparatus comprising the above described anchor members is also disclosed.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
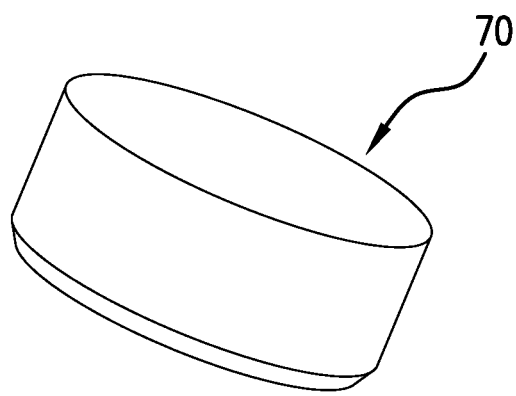
FIG. 1A is an isometric view of an insert according to an embodiment of the disclosure.

The inventors hereof have developed inserts that are effective to bite into another member such as a casing while at the same time can be easily removed. The inserts and the tools comprising the same reduce the milling or drilling time, increase the life of the bits, and reduce the amount of the insert material that is left downhole.

Without wishing to be bound by theory, it is believed that the effectiveness of the biting depends on the hardness of the inserts, whereas the millability or drillability of the inserts depends on the brittleness of the insert material. In an embodiment, the inserts disclosed herein are hollow inserts that contain a material, which is hard and brittle at the same time. The desired harness allows the inserts to bite into the casing, create friction, and anchor the tools. The brittleness of the material in combination with the hollow structure of the inserts allow the inserts to be easily removed by breaking into smaller pieces under a load bigger than the setting force. In another advantageous feature, the hollow inserts have a bulk density that is less than the density of the downhole fluids. Once other parts of the tools are milled or disintegrated, the inserts become afloat in the downhole fluids. Accordingly the hollow inserts can be carried back to the surface by the downhole fluids instead of settling to the bottom of the wellbore.

In another embodiment, a portion of the inserts are embedded in the substrate of an anchor member and a portion of the inserts are exposed and extending outwardly from an outer surface of the substrate. Because only a portion of the inserts bite into the casing, the inserts in this embodiment contain a soft material and a hard material, wherein the portion that bites into the casing contains a hard material and the portion that is embedded in the substrate contains a soft material. The inserts can have a gradient in the weight ratio of the soft material to the hard material in order to increase the strength of the inserts and to reduce thermal mismatch between the soft and hard materials. The inserts according to the embodiment are effective to bite into a casing while at the same can be easily milled once they are no longer needed.

As used herein, hollow inserts refer to inserts comprising a shell at least partially defining an empty core. The materials for the hollow inserts include one or more of the following: an intermetallic compound; a ceramic; a surface hardened material; a titanium alloy; or a composite.

An intermetallic compound refers to a solid-state compound exhibiting metallic bonding, defined stoichiometry and ordered crystal structure. An alloy is not necessarily an intermetallic compound. Exemplary intermetallic compounds suitable for the hollow inserts include one or more of the following: NiTi; NiAl; $Ni_3Al$; $Al_2Cu$; FeAl; $Al_{12}Mg_{17}$; $Al_3Mg_2$; $Cu_3Sn$; or $Ag_3Sn$.

Ceramics include SiC, $Al_2O_3$, and $Si_3N_4$. Surface hardened materials include surface hardened Fe—C alloys such as surface hardened low carbon steels, surface hardened medium carbon steels, surface hardened high carbon steels, surface hardened alloy steels, surface hardened tool steels, and surface hardened stainless steels, as well as surface hardened special steels such as high aluminum low density steels. Combinations of the materials can be used.

Surface hardened materials are provided by treating a surface hardenable material such as low carbon steels, medium carbon steels, high carbon steels, alloy steels, tool steels, stainless steels, or high aluminum low density steels via diffusion methods, selective-hardening methods, layer addition methods, or a combination comprising at least one of the foregoing. As used herein, "low carbon steels" refer to steels that contain about 0.05 wt. % to about 0.25 wt. % of carbon based on the total weight of the steels. "Medium carbon steels" refer to steels that contain about 0.3 wt. % to about 0.6 wt. % of carbon based on the total weight of the steels. "High carbon steels" refer to steels that contain about 0.6 wt. % to about 2 wt. % of carbon based on the total weight of the steels. "Alloy steels" refers to steels with other alloying elements added deliberately in addition to the carbon. Common alloyants include manganese, nickel, chromium, molybdenum, vanadium, silicon, boron, aluminum, cobalt, copper, cerium, niobium, titanium, tungsten, tin, zinc, lead, zirconium, or a combination comprising at least one of the foregoing.

Diffusion methods can be used to form surface hardened materials. For low carbon steels, surface hardening diffusion methods include carburizing, carbonitriding, and ferritic nitrocarburizing. For alloy steels, surface hardening diffusion methods include nitriding and ion nitriding. For tool steels, surface hardening diffusion methods include boriding, salt nitriding, gas nitriding, and ion nitriding. For stainless steels, surface hardening diffusion methods include gas nitriding, ion nitriding, and ferritic nitrocarburizing.

Selective-hardening methods can also be used to provide surface hardened materials. Exemplary selective-hardening methods include flame hardening, induction hardening, laser hardening, and electron beam hardening.

Layer addition methods can also be used to provide surface hardened materials. Exemplary layer addition methods include hardfacing such as welded overlay, thermal spray; and coatings methods such as electrochemical plating, CVD/electroless plating, PVD, and ion mixing.

In an embodiment, the hollow inserts comprise a composite including a matrix material and a binder. The matrix material includes SiC; $Al_2O_3$; $Si_3N_4$; a surface hardenable Fe—C alloy; titanium alloy; and the binder comprises one or more of the following: NiTi; NiAl; $Ni_3Al$; $Al_2Cu$; FeAl; $Al_{12}Mg_{17}$; $Al_3Mg_2$; $Cu_3Sn$; or $Ag_3Sn$. Exemplary surface hardenable Fe—C alloy for the matrix material includes medium carbon steels, high carbon steels, alloy steels, or a combination thereof. Alternatively the matrix material includes an intermetallic compound that comprises one or more of the following: NiTi; NiAl; $Ni_3Al$; $Al_2Cu$; FeAl; $Al_{12}Mg_{17}$; $Al_3Mg_2$; $Cu_3Sn$; or $Ag_3Sn$ and the binder includes a Fe—C alloy. The Fe—C alloy in the binder is not hardened.

The composites have a microstructure comprising a plurality of grains formed from the matrix material; and a gain boundary layer comprising the binder. The grains have an average size of about 5 to about 300 microns. The grain boundary layer has a thickness of about 10 nm to about 200 µm or about 50 nm to about 100 µm. The grain boundary layer surrounds each grain at a microstructural level. Without wishing to be bound by theory, it is believed that the presence of the grain boundary layer as described herein increases the brittleness of the composites.

The composites have about 55 to about 95 volume %, specifically about 70 to about 90 volume % of the matrix material and about 5 to about 45 volume %, specifically about 10 to about 30 volume % of the binder. The composite can be made by blending the matrix material and the binder then molding the blend for example. Optionally the composite is surface hardened using the methods disclosed herein.

The hollow inserts can be fully closed or partially open. In other words, the shell can fully encompass the empty core or partially encompass the empty core. Advantageously, the inserts, particularly the fully closed hollow inserts, have a bulk density less than the density of the downhole fluids. In the event that the substrate of an anchor member that carries the inserts is milled or disintegrates, the inserts become loose and flow back to the surface with downhole fluids. In an embodiment, the geometry and the material of the hollow inserts are selected such that the inserts have a bulk density of less than about 2.0 g/cc (gram/cubic centimeter), less than about 1.9 g/cc, or less than about 1.8 g/cc. The bulk density of the inserts can be determined by dividing the weight of the inserts by the total volume that the inserts occupy.

The hollow inserts can be manufactured by methods such as additive manufacturing and molding. For example, partially closed hollow inserts can be manufactured by molding a core material together with a shell material. The shell material is the insert material as disclosed herein for the hollow inserts. The core material can be any material that has a lower melting point than the shell material. Once the inserts are molded, the core material is melted away providing partially closed hollow inserts.

Figure 1B:
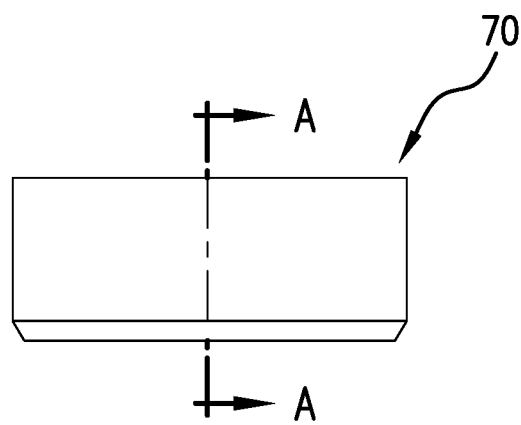
FIG. 1B is a side view of the insert of FIG. 1A.
Figure 2:
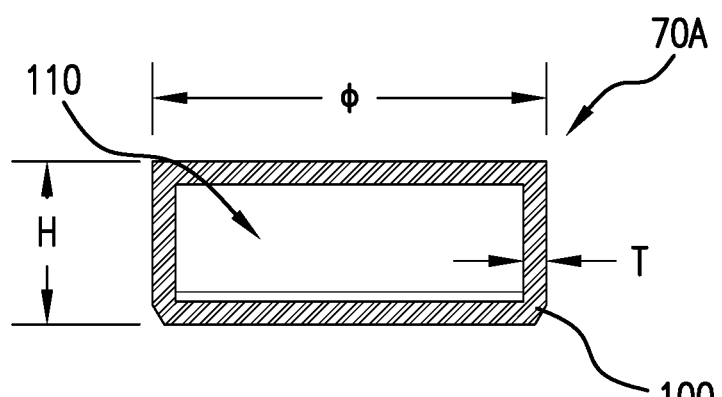
FIG. 2 is a cross-sectional view along A-A direction of the insert of FIG. 1B, where the insert is in the form of a fully closed hollow button according to an embodiment of the disclosure.
Figure 3:
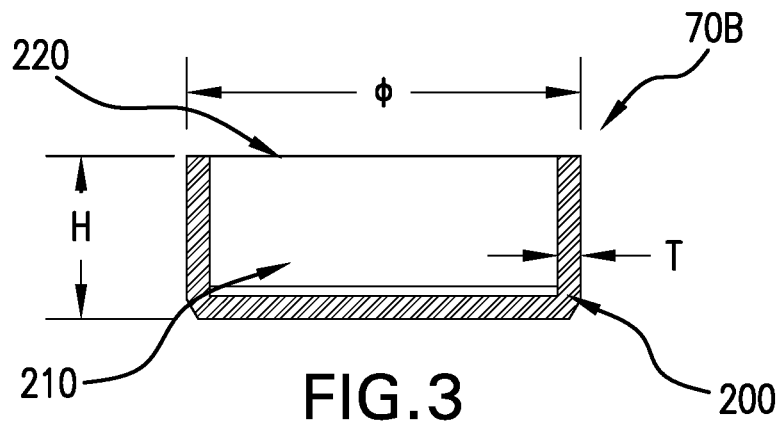
FIG. 3 is a cross-sectional view along A-A direction of the insert of FIG. 1B, where the insert is in the form of a partially closed hollow button according to another embodiment of the disclosure.

FIG. 1A is an isometric view of an insert 70, and FIG. 1B is a side view of the insert 70. An exemplary insert 70A in the form of a fully closed hollow button is illustrated in FIG. 2. An exemplary insert 70B in the form of a partially closed hollow button is illustrated in FIG. 3. The hollow button 70A has a shell 100 completely encompassing an empty core 110. The hollow button 70B has a shell 200 partially encompassing an empty core 210 with an opening shown as 220.

In another embodiment, the inserts comprise functional gradient materials. Such inserts have an inner portion and an outer portion disposed on the inner portion. The volume ratio of the inner portion relative to the outer portion is about 5:1 to about 1:2, or about 4:1 to about 1:1, or about 3:1 to about 2:1.

The inner portion comprises a soft material such as a low carbon steel or an aluminum alloy. The outer portion comprises a hard material as well as a soft material. The soft material in the outer portion can be the same or different from the soft material in the inner portion of the inserts. The hard material comprises one or more of the following: an intermetallic compound; a ceramic; a hard steel; or a titanium alloy. The intermetallic compound comprises one or more of the following: NiTi; NiAl; $Ni_3Al$; $Al_2Cu$; FeAl; $Al_{12}Mg_{17}$; $Al_3Mg_2$; $Cu_3Sn$; or $Ag_3Sn$. The ceramic comprises one or more of the following SiC; $Al_2O_3$; or $Si_3N_4$. As used herein, hard steels refer to high carbon steels, tool steels, alloy steels, or a combination comprising at least one of the foregoing.

The outer portion of the inserts has a gradient in the weight ratio of the soft material to the hard material. The gradient comprises an increasing weight ratio of the hard material to the soft material from the inner portion of the insert to the outer portion of the insert. The gradient can vary continuously from the inner portion of the insert to the outer portion of the insert. The gradient can also vary in discrete steps from the inner portion of the insert to the outer portion of the insert. The gradient improves the strength of the inserts and reduces thermal mismatch between the inner portion and the surface material. Additive manufacturing can be used to make the functionally gradient inserts.

Figure 4:
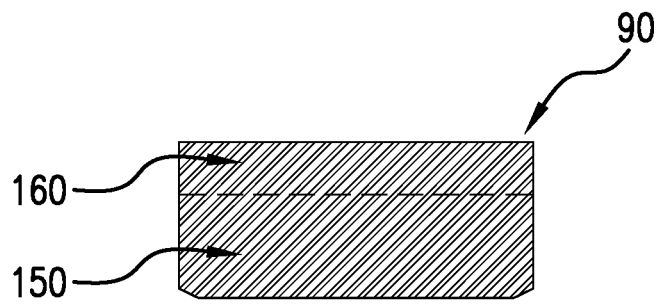
FIG. 4 is a cross-sectional view of an insert having a functionally gradient surface.

FIG. 4 is a cross-sectional view of an insert having a functionally gradient portion. As shown in FIG. 4, the insert 90 has an inner portion 150 and an outer portion 160, wherein the outer portion has a gradient in the relative weight of a soft material and a hard material.

The inserts including hollow inserts and functionally gradient inserts can be in various forms. In an embodiment, the inserts are cylinders. Illustrative inserts have a diameter (ø) of about ¼ inch to about ¾ inch and a height (H) of about ⅛ inch to about 1 inch. Hollow inserts have a wall thickness (T) of about 0.01 inch to about 0.1 inch. The inserts have a material density of about 1 g/cc to about 10 g/cc, specifically about 3 g/cc to about 8 g/cc. The bulk density of the inserts is less than about 2 g/cc, less than about 1.9 g/cc, or less than about 1.8 g/cc.

Figure 5:
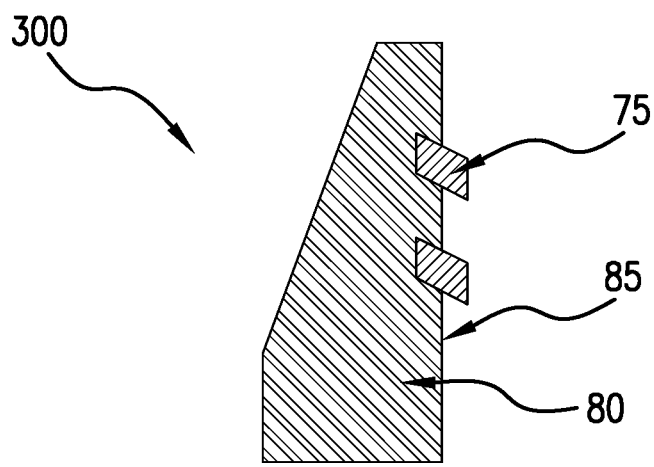
FIG. 5 is a partial cross-sectional view of an anchor member having a insert of FIG. 2, 3, or 4.

The inserts can be installed in a substrate and configured for engagement with another member such as a casing or other tubular members. In an embodiment, an anchor member comprises a substrate and at least one insert secured to the substrate and extending outwardly from an outer surface of the substrate. In an embodiment, the anchor member is a slip assembly. An exemplary anchor member is illustrated in FIG. 5. Referring to FIG. 5, the anchor member 300 includes substrate 80 and inserts 75 extending from outer surface 85 of substrate 80. For functionally gradient inserts, the inserts are installed in such a way that at least a part of the outer portion of the inserts is configured for engagement with another member. For partially closed hollow inserts, the inserts are installed in such a way that the opening of the partially closed hollow inserts is embedded in the substrate of the anchor member.

The substrates of the anchor member contain a non-degradable material or degradable material upon exposure to a fluid. The fluids may include any number of ionic fluids or highly polar fluids, such as those that contain various chlorides or bromides. Examples include fluids comprising potassium chloride (KCl), hydrochloric acid (HCl), calcium chloride ($CaCl_2$), calcium bromide ($CaBr_2$) or zinc bromide ($ZnBr_2$).

Exemplary non-degradable materials include a low carbon steel or an aluminum alloy, or a combination comprising at least one of the foregoing. Materials appropriate for the purpose of degradable substrates are lightweight, high-strength metallic materials. Examples of degradable materials and their methods of manufacture are described in United States Patent Publication No. 2011/0135953 (Xu, et al.), the content of which is hereby incorporated herein by reference in its entirety. These lightweight, high-strength and selectably and controllably degradable materials include fully-dense, sintered powder compacts formed from coated powder materials that include various lightweight particle cores and core materials having various single layer and multilayer nanoscale coatings. These degradable materials include various particle cores and core materials dispersed within a cellular nanomatrix formed from the various nanoscale coatings.

Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc, Y, La, Ce, Pr, Nd or Er, or a combination of rare earth elements. In other embodiments, the materials could include other metals having a standard oxidation potential less than that of Zn. Also, suitable non-metallic materials include ceramics, glasses (e.g., hollow glass microspheres), carbon, metallic oxides, nitrides, carbides or a combination thereof. In an embodiment, the coating layers are formed from Al, Ni, W or $Al_2O_3$, or combinations thereof. The coating can be a multi-layer coating, for example, comprising a first Al layer, a $Al_2O_3$ layer, and a second Al layer. In some embodiments, the coating may have a thickness of about 25 nm to about 2500 nm.

Figure 6:
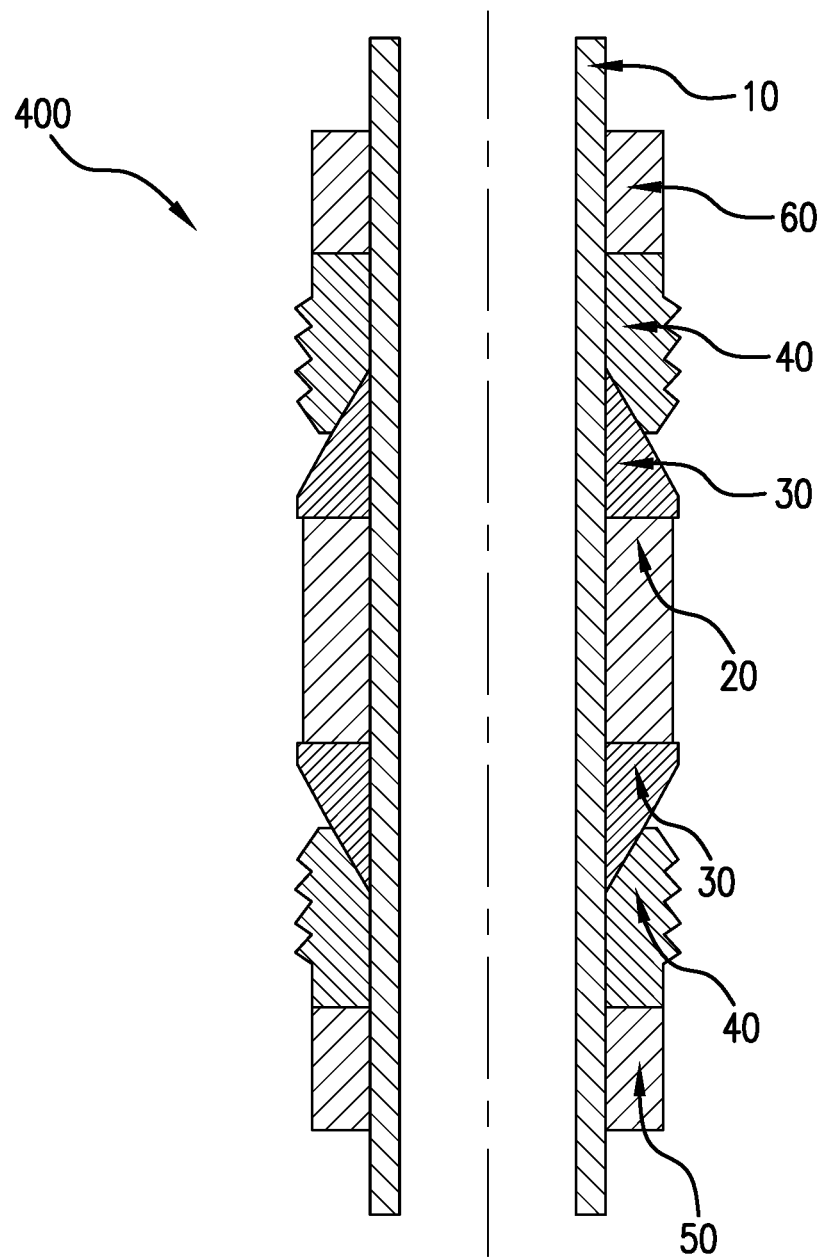
FIG. 6 illustrates a frac plug comprising the anchor member of FIG. 5.

The anchor member disclosed herein can be used in various downhole tools to anchor the tools in place once set. For example, the anchor member may be wedge-shaped for engaging with another member such as a tubular wall in response to a load applied to the anchor member. An exemplary downhole apparatus comprising the anchor member is shown in FIG. 6. Referring to FIG. 6, a downhole apparatus 400 includes a bottom sub 50 that is disposed at an end of the tool. A seal member 20 is radially expandable in response to being moved longitudinally against a frusto-conical member 30. One way of moving the seal member 20 relative to the frustoconical member 30 is to compress longitudinally the apparatus with a setting tool (not shown) via abutment member 60. The apparatus also includes an anchor member 40, such as the one illustrated in FIG. 5. The frustoconical member 30, the seal member 20, the anchor member 40, the abutment member 60, and the bottom sub 50 can all be disposed about an annular body 10, which is a tubing, mandrel, or the like. In specific embodiments, the downhole apparatus is a frac plug, a bridge plug, or a packer.

Set forth below are various embodiments of the disclosure.

Embodiment 1

An anchor member, comprising: a substrate; and at least one insert secured to the substrate and extending outwardly from an outer surface of the substrate; the insert configured for engagement with another member and comprising a shell at least partially defining an empty core.

Embodiment 2

The anchor member of Embodiment 1, wherein the insert comprises one or more of the following: an intermetallic compound; a ceramic; a surface hardened material; a titanium alloy; or a composite.

Embodiment 3

The anchor member of Embodiment 2, wherein the intermetallic compound comprises one or more of the following: NiTi; NiAl; $Ni_3Al$; $Al_2Cu$; FeAl; $Al_{12}Mg_{17}$; $Al_3Mg_2$; $Cu_3Sn$; or $Ag_3Sn$.

Embodiment 4

The anchor member of Embodiment 2, wherein the ceramic comprises one or more of the following SiC; $Al_2O_3$; or $Si_3N_4$.

Embodiment 5

The anchor member of Embodiment 2, wherein the surface hardened material comprises one or more of the following: surface hardened low carbon steel; surface hardened alloy steel; surface hardened tool steel; surface hardened stainless steel; or surface hardened high aluminum low density steel.

Embodiment 6

The anchor member of Embodiment 2, wherein the composite comprises: a matrix material comprising one or more of the following: SiC; Al$_2$O$_3$; Si$_3$N$_4$; a surface hardandable Fe—C alloy; titanium alloy; and a binder comprising one or more of the following: NiTi; NiAl; Ni$_3$Al; Al$_2$Cu; FeAl; Al$_{12}$Mg$_{17}$; Al$_3$Mg$_2$; Cu$_3$Sn; or Ag$_3$Sn.

Embodiment 7

The anchor member of Embodiment 2, wherein the composite comprises: a matrix material comprising NiTi; NiAl; Ni$_3$Al; Al$_2$Cu; FeAl; Al$_{12}$Mg$_{17}$; Al$_3$Mg$_2$; Cu$_3$Sn; or Ag$_3$Sn; and a binder comprising a Fe—C alloy.

Embodiment 8

The anchor member of any one of Embodiments 1 to 7, wherein the insert is configured to have a bulk density of less than about 2 g/cc.

Embodiment 9

The anchor member of any one of Embodiments 1 to 8, wherein the shell fully encompasses the empty core.

Embodiment 10

The anchor member of any one of Embodiments 1 to 9, wherein the substrate comprises a material that is non-degradable upon exposure to a fluid.

Embodiment 11

The anchor member of any one of Embodiments 1 to 9, wherein the substrate comprises a degradable material with respect to a fluid.

Embodiment 12

A downhole apparatus comprising the anchor member of any one of Embodiments 1 to 11.

Embodiment 13

The downhole apparatus of Embodiment 12, wherein the downhole apparatus is a frac plug, a bridge plug, or a packer.

Embodiment 14

An anchor member, comprising: a substrate; and at least one insert secured to the substrate and extending outwardly from an outer surface of the substrate; the insert configured for engagement with another member and comprising an inner portion and an outer portion disposed on the inner portion; the inner portion comprising a soft material which comprises one or more of the following: a low carbon steel or an aluminum alloy; and the outer portion comprising the soft material and a hard material and having a gradient in the weight ratio of the soft material to the hard material, the hard material comprising one or more of the following: an intermetallic compound; a ceramic; a hard steel; or a titanium alloy.

Embodiment 15

The anchor member of Embodiment 14, wherein the intermetallic compound comprises one or more of the following: NiTi; NiAl; Ni$_3$Al; Al$_2$Cu; FeAl; Al$_{12}$Mg$_{17}$; Al$_3$Mg$_2$; Cu$_3$Sn; or Ag$_3$Sn.

Embodiment 16

The anchor member of Embodiment 14, wherein the ceramic comprises one or more of the following SiC; Al$_2$O$_3$; or Si$_3$N$_4$.

Embodiment 17

The anchor member of any one of Embodiments 14 to 16, wherein the gradient comprises an increasing weight ratio of the hard material to the soft material from the inner portion of the insert to the outer portion of the insert.

Embodiment 18

The anchor member of any one of Embodiments 14 to 17, wherein the gradient varies continuously from the inner portion of the insert to the outer portion of the insert.

Embodiment 19

The anchor member of any one of Embodiments 14 to 17, wherein the gradient varies in discrete steps from the inner portion of the insert to the outer portion of the insert.

Embodiment 20

A downhole apparatus comprising the anchor member of any one of Embodiments 14 to 19.

Embodiment 21

The downhole apparatus of Embodiment 20, wherein the downhole apparatus is a frac plug, a bridge plug, or a packer.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:
1. An anchor member, comprising:
a substrate; and
at least one insert secured to the substrate and extending outwardly from an outer surface of the substrate; the insert configured for engagement with another member and comprising a shell fully enclosing an empty core, wherein the insert comprises an intermetallic compound, optionally in combination with one or more of a ceramic, a surface hardened material, a titanium alloy, or a composite; and the insert is configured to have a bulk density of less than about 2 g/cc.
2. The anchor member of claim 1, wherein the intermetallic compound comprises one or more of the following: NiTi; NiAl; Ni$_3$Al; Al$_2$Cu; FeAl; Al$_{12}$Mg$_{17}$; Al$_3$Mg$_2$; Cu$_3$Sn; or Ag$_3$Sn.

3. The anchor member of claim 1, wherein the insert comprises the ceramic, and the ceramic comprises one or more of the following SiC; $Al_2O_3$; or $Si_3N_4$.

4. The anchor member of claim 1, wherein the insert comprises the surface hardened material and the surface hardened material comprises one or more of the following: surface hardened low carbon steel; surface hardened alloy steel; surface hardened tool steel; surface hardened stainless steel; or surface hardened high aluminum low density steel.

5. The anchor member of claim 1, wherein the insert comprises the composite and the composite comprises:
   a matrix material comprising one or more of the following: SiC; $Al_2O_3$; $Si_3N_4$; a surface hardandable Fe—C alloy; titanium alloy; and
   a binder comprising one or more of the following: NiTi; NiAl; $Ni_3Ai$; $Al_2Cu$; FeAl; $Al_{12}Mg_{17}$; $Al_3Mg_2$; $Cu_3Sn$; or $Ag_3Sn$.

6. The anchor member of claim 1, wherein the insert comprises the composite and the composite comprises:
   a matrix material comprising NiTi; NiAl; $Ni_3Al$; $Al_2Cu$; FeAl; $Al_{12}Mg_{17}$; $Al_3Mg_2$; $Cu_3Sn$; or $Ag_3Sn$; and
   a binder comprising a Fe—C alloy.

7. The anchor member of claim 1, wherein the substrate comprises a material that is non-degradable upon exposure to a fluid.

8. The anchor member of claim 1, wherein the substrate comprises a degradable material with respect to a fluid.

9. A downhole apparatus comprising the anchor member of claim 1.

10. The downhole apparatus of claim 9, wherein the downhole apparatus is a frac plug, a bridge plug, or a packer.

11. The anchor member of claim 1, wherein the shell has a thickness of about 0.01 inch to about 0.1 inch.

* * * * *